United States Patent
Uhlhorn

(10) Patent No.: US 8,219,835 B1
(45) Date of Patent: Jul. 10, 2012

(54) POWER CONSERVATION IN A DATA COMMUNICATION NETWORK

(75) Inventor: Brian L. Uhlhorn, St. Paul, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 547 days.

(21) Appl. No.: 12/199,361

(22) Filed: Aug. 27, 2008

(51) Int. Cl.
*G06F 1/00* (2006.01)

(52) U.S. Cl. ...................................... 713/310

(58) Field of Classification Search ........... 713/300–340
See application file for complete search history.

(56) References Cited

U.S. PATENT DOCUMENTS

| | | | | |
|---|---|---|---|---|
| 4,635,639 A | * | 1/1987 | Hakala et al. ................. 607/4 |
| 4,817,146 A | * | 3/1989 | Szczutkowski et al. ....... 380/261 |
| 5,404,544 A | * | 4/1995 | Crayford ....................... 713/310 |
| 5,649,212 A | * | 7/1997 | Kawamura et al. ............ 713/324 |
| 5,742,833 A | * | 4/1998 | Dea et al. ...................... 713/323 |
| 5,983,353 A | * | 11/1999 | McHann, Jr. ................. 713/310 |
| 6,047,378 A | * | 4/2000 | Garrett et al. ................. 713/300 |
| 6,049,885 A | * | 4/2000 | Gibson et al. ................. 713/324 |
| 6,085,328 A | * | 7/2000 | Klein et al. ................... 713/310 |
| 6,282,642 B1 | * | 8/2001 | Cromer et al. ................ 713/2 |
| 6,311,276 B1 | * | 10/2001 | Connery et al. ............... 726/2 |
| 6,760,850 B1 | * | 7/2004 | Atkinson et al. .............. 713/320 |
| 7,073,077 B1 | * | 7/2006 | Gavlik ......................... 713/300 |
| 7,184,667 B2 | | 2/2007 | Booth |
| 7,398,408 B2 | * | 7/2008 | Paljug .......................... 713/323 |
| 7,809,966 B2 | * | 10/2010 | Imao ............................ 713/320 |
| 2002/0019954 A1 | | 2/2002 | Tran |
| 2002/0027690 A1 | | 3/2002 | Bartur et al. |
| 2002/0046355 A1 | | 4/2002 | Takeuchi |
| 2004/0003296 A1 | | 1/2004 | Robert et al. |

FOREIGN PATENT DOCUMENTS

EP 0 851 615 A2 7/1998

* cited by examiner

*Primary Examiner* — Paul R Myers

(74) *Attorney, Agent, or Firm* — Hamre, Schumann, Mueller & Larson, P.C.

(57) ABSTRACT

Techniques for reducing power consumption in a data communications network are described where a power consuming component in a receiving node has a default disabled state and must be changed to an enabled state to enable the power consuming component. The receiving node includes a resonator that sends an enable signal to enable the power consuming component when the resonator receives an enabling data pattern. The power consuming component remains disabled until the enabling data pattern is received by the resonator.

10 Claims, 4 Drawing Sheets

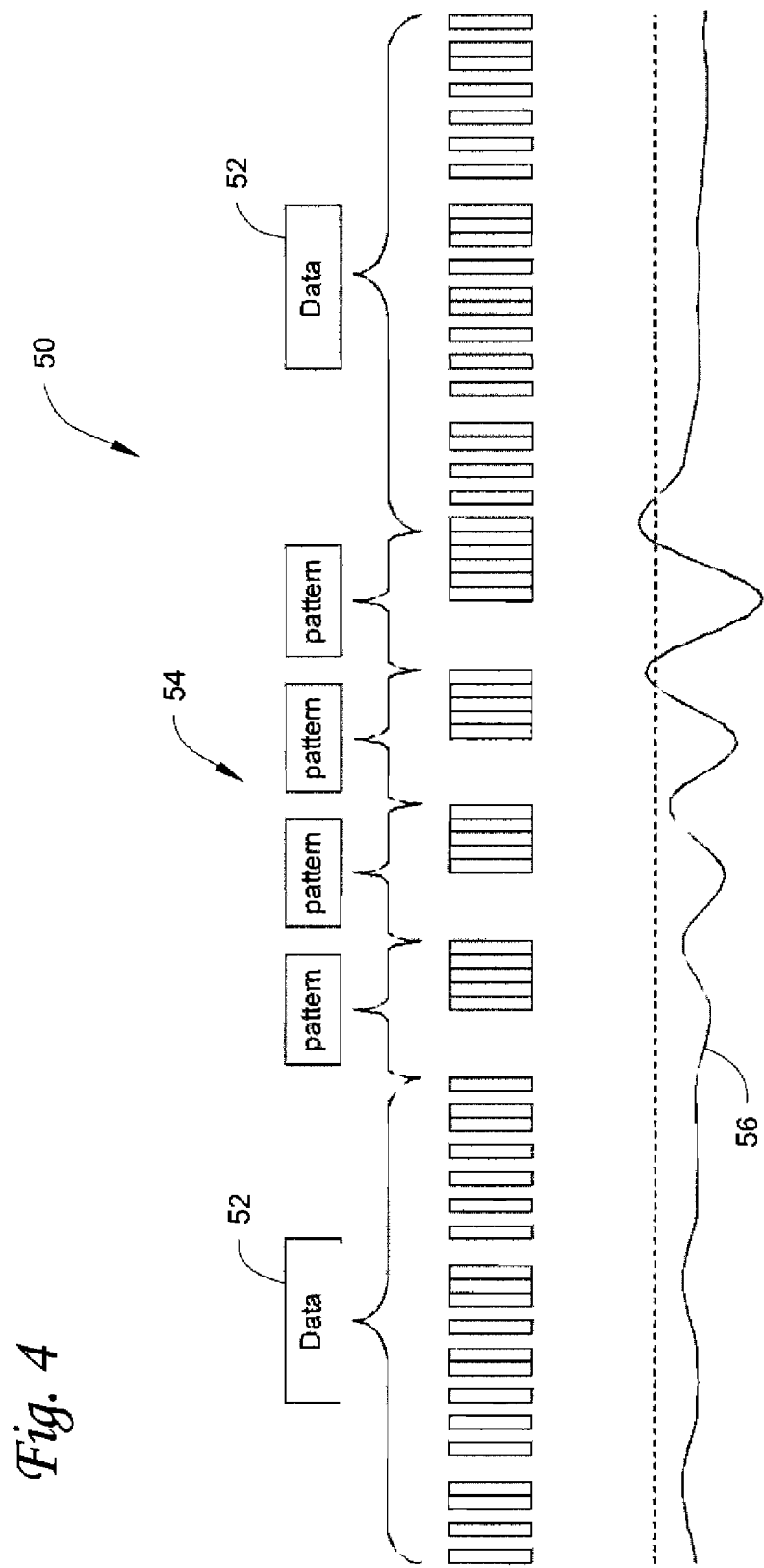

POWER CONSERVATION IN A DATA COMMUNICATION NETWORK

FIELD

This disclosure generally relates to devices and methods for conserving power in a data communication network, for example in high-speed data communication networks such as fiber optic networks.

BACKGROUND

Data transmission and communications, particularly high speed data communications, is a general field of interest that is widely studied. For example, both electrical and optical mediums, such as optical fibers, have been known approaches in data transmission and communication networks.

In one example of a communications network 1 shown in FIG. 1, a network such as a fiber optic network based on a passive star coupler is an example of a broadcast and select communication network architecture. A signal from a source node N is available to all other sink nodes S/N attached to the network. A sink node S/N has access to all signals placed onto the network. For a sink node to receive signals from one or multiple source nodes N at the same time, the sink node S/N must be enabled to receive the appropriate signals.

In the example of fiber optic communications, wavelength-division multiplexing (WDM) is a known technology which multiplexes multiple optical carrier signals on a single optical fiber by using different wavelengths (colors) of laser light to carry different signals. The term wavelength-division multiplexing is commonly applied to an optical carrier, which is typically described by its wavelength. In a wavelength-division multiplexing (WDM) broadcast and select architecture, many transmission channels are employed where each receiving node would typically need a photonic receiver and a serializer/deserializer (SERDES) for every WDM transmission channel on the fiber optic network. A SERDES is generally known and commonly used in high speed communications to convert data between serial data and parallel data interfaces in each direction. Thus, many SERDES are typically employed to receive all of the wavelengths in a WDM broadcast.

In many cases, however, a receiving or sink node would not be interested in all of the channels all of the time. FIG. 2 shows an example of the problem encountered in photonic deserialization activation in a typical fiber optic network FON configuration. As shown, the fiber optic network FON includes one or more source nodes (see Source Nodes A, B) that each include a processor, SERDES, and transmitter TX that transmit data through optical fibers to one or more sink nodes (see Sink Nodes C, D). Many designs require photonic receivers RX and the many SERDES (see Sink Nodes C, D) to remain powered constantly in order to be enabled so that processors can receive the data (e.g. wavelengths) transmitted by the source nodes (see Source Nodes A, B). It is known that high speed SERDES consume a significant amount of power. For example, a high speed photonic receiver and SERDES are estimated to consume approximately 0.5 Watts per channel received. Being able to temporarily shut down a SERDES or leave a SERDES powered down until it needs to be enabled would provide a significant power savings.

Previous designs to address this issue have been:

1. Use of a network controller that monitors all transmissions and communicates with each receiving node through a command channel to indicate when the receiving nodes should turn on which channels. This method, however, can consume significant resources (e.g. space, processing, bandwidth), and can require additional equipment, can experience loss of architecture flexibility, may not save power, and can introduce a single point of failure which could take down the entire network.

2. Use of a low speed signal embedded on top of a data transmission. Typical receiving nodes are designed to remove such low speed signals or slow transients to improve the high speed channel performance. Such a method requires adding a second modulation to the transmitting node which increases complexity of the network design.

3. Shutting down the transmitter and restarting. Such an approach can significantly interrupt other sink nodes receiving information on their channel(s).

4. Enable a receiving node so that its receive channel(s) are on a fixed schedule. This approach may save power, however, instances where SERDES should be activated may be missed. Power also would be wasted whenever the channel(s) are not needed, which could occur over extended periods of time.

Despite existing technology, devices and methods relating to enabling and disabling power consuming components, such as receiving nodes generally and SERDES channels in fiber optic networks can be further improved. Particularly, improvements are desired for increasing efficient use of power by such power consuming components.

SUMMARY

A technique for reducing power consumption in a data communications network is described where a power consuming component in a receiving node has a default disabled state and must be changed to an enabled state to enable the power consuming component. In one area of use, the technique described herein can be employed in applications related to high speed data transmission networks for limiting power consumption to when data transmission is needed or desired. For example, the inventive concepts described herein relate to an enable/disable functionality for allowing high speed data to be transmitted, deserializing the data, and transmitting the data in a parallel form which can interface with a power consuming component or sink, such as a SERDES and/or processor. However, it will be appreciated that the technique described herein generally can be used for enabling any power consuming component where improved and efficient power consumption capability is needed and/or desired.

Generally, enabling a power consuming component includes employing a resonator that receives an enabling data pattern from a data source. The power consuming component is enabled by the resonator when the resonator receives the enabling data pattern. When enabled, the power consuming component can receive data transmitted from the data source. The power consuming component remains in a default disabled or standby state, where it does not receive data transmitted from the data source, until the resonator receives the enabling data pattern. Once enabled, the power consuming component can then function, for example receive data from the data source. When the resonator no longer receives the enabling data pattern, the power consuming component returns to its default disabled or standby state for example either immediately, after a set time period, after a defined function has completed, upon receiving a different indicator or signal, or when the resonator receives another enabling data pattern. Thus, the resonator controls the state of the power consuming component.

Among other benefits, the inventive concepts described herein can help avoid the need for significant resources (e.g. physical space, further processing, and bandwidth) to operate a communications network and can avoid a single point of failure, which can help avoid some of the risk of failure of an entire communications network. Adding a resonator to a receiving channel can avoid the need to add other complexities, such as a second modulation functionality on the transmission side of a communications network. Other benefits can also include that the enabling data pattern can be selected and embedded in an original data stream, which can simply pause a data stream without having to shut down the transmission side of a network and restarting, thereby avoiding interruption of other receiving channels from receiving data.

In one embodiment, a power saving receiving node includes a channel that is connected to a data source to receive data therefrom. A power consuming component is operatively connected to the channel to receive data from the channel. To conserve power, the power consuming component has a default disabled state where it does not receive data from the channel. A resonator is operatively connected to the channel and to the power consuming component. The resonator is configured such that when it receives an enabling data pattern, for example from the data source or from the channel, the resonator generates an enable signal that enables the power consuming component. When the component is enabled, it can then perform its intended function, for example listening to the channel.

In another embodiment, a communication network includes a data source configured to transmit data that contains an enabling data pattern. A receiving node is connected to the data source to receive data transmitted thereby, the receiving node includes a data receiver, a power consuming component is connected to the data receiver, and a resonator is connected to the data receiver and to the power consuming component. The power consuming component has a disabled state and an enabled stated, and the power consuming component changes from the disabled state to the enabled state when the resonator receives the enabling data pattern and sends an enabling signal to the power consuming component.

In another embodiment, a method of enabling a power consuming component from a disabled state includes sending an enabling data pattern from a data source to a resonator that is operatively connected to the power consuming component. The enabling data pattern causes the resonator to generate an enable signal. The enable signal generated by the resonator is then used to change the power consuming component from the disabled state to an enabled state.

In another embodiment, a plurality of resonators can be employed where each resonator is dedicated to a distinct channel and to a distinct power consuming component. Each resonator can receive an enabling data pattern from a data source that enables the respective distinct power consuming component to receive data transmitted through the respective distinct channel. In the absence of the enabling data patterns, the respective distinct power consuming components are disabled and do not receive data transmitted through the respective distinct channels. The enabling patterns for the resonators can be the same or different.

In yet another embodiment, a single resonator can be used that is dedicated to a plurality of channels and dedicated to a plurality of power consuming components. Each channel is connected to a distinct power consuming component. The single resonator can receive an enabling data pattern to enable each power consuming component.

DRAWINGS

FIG. 4 is an example of data from a data source and includes an example of an enabling data pattern in accordance with the inventive principles described herein.

DETAILED DESCRIPTION

A technique for reducing power consumption in a data communications network is described. The techniques described herein can be used, for example, in applications related to high speed data transmission networks and other applications where reduced power consumption capability is needed and/or desired. The description herein relates to reducing power consumption of a power consuming component based on when data transmission is actually needed or desired. For example, the inventive concepts herein relate to communication networks where data is transmitted, deserialized, and transmitted in a parallel form. However, the inventive concepts can be applied to many types of data communications networks.

Generally, reducing power consumption includes providing a power consuming component that has a default disabled state which utilizes less power than when the power consuming component is in an enabled state. The power consuming component is enabled using a resonator that receives an enabling data pattern. The power consuming component receives an enable signal from the resonator when the resonator receives the enabling data pattern, which enables the power consuming component. When enabled, the power consuming component can, for example, receive data transmitted from the data source. Until the resonator receives the enabling data pattern, the power consuming component remains in its default disabled or standby state so that it consumes less power.

Figure 1:
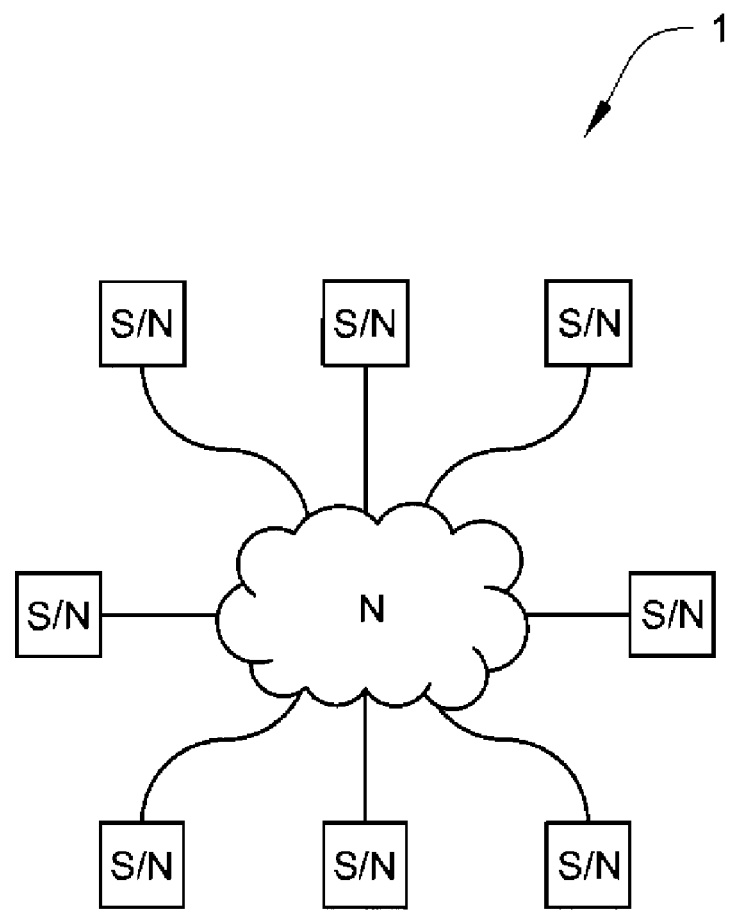
FIG. 1 is one example of a known general data network.
Figure 2:
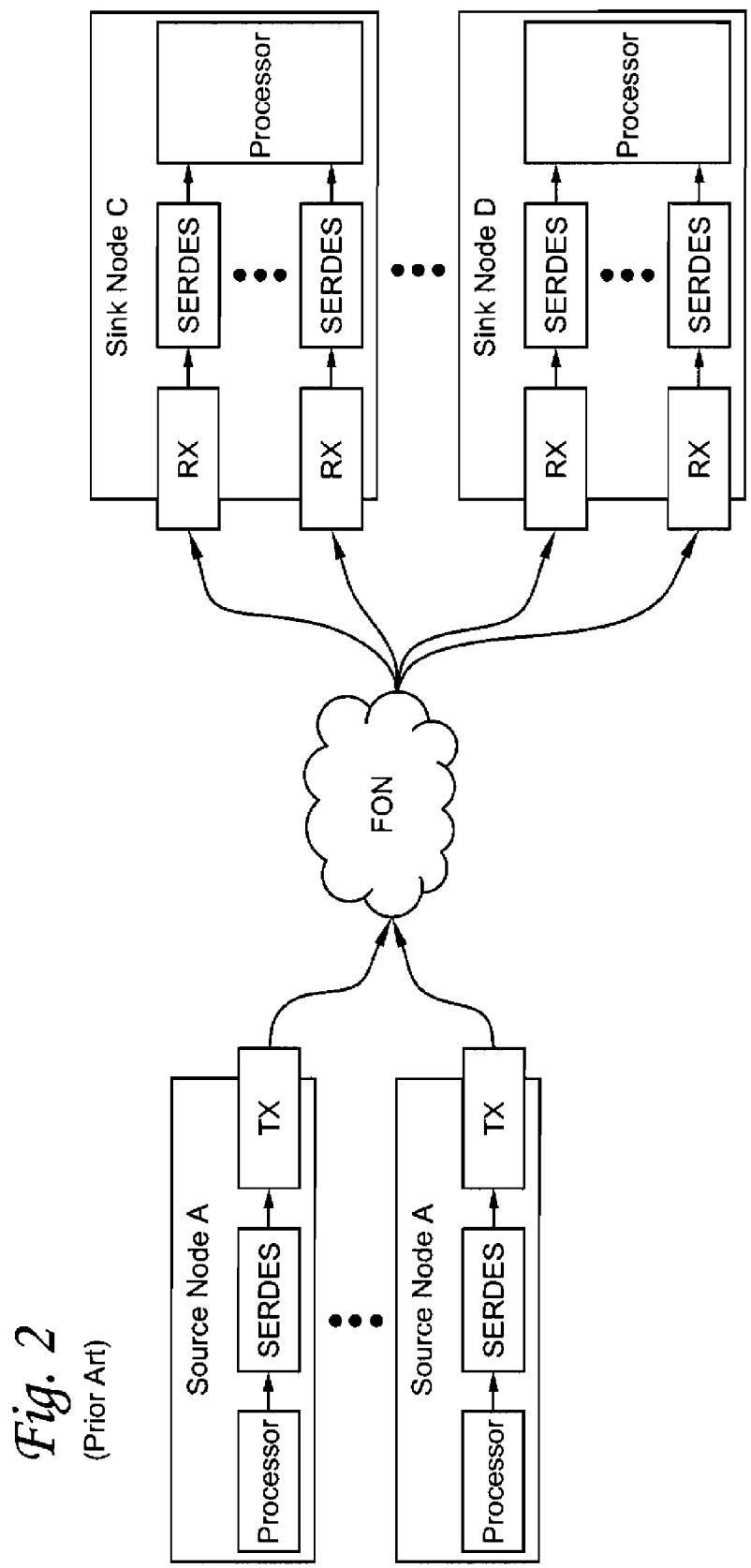
FIG. 2 is one example of a known fiber optic network.
Figure 3:
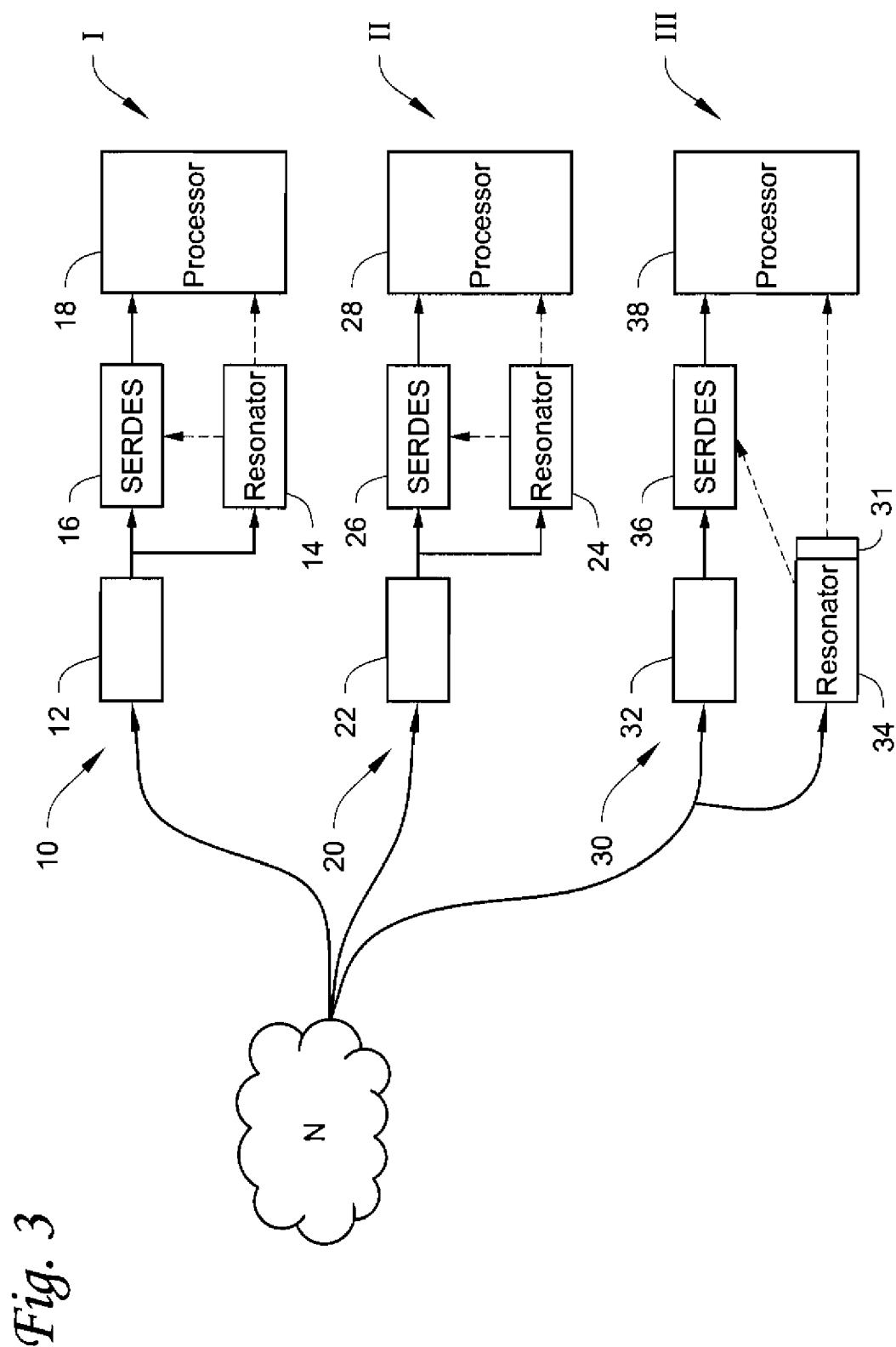
FIG. 3 shows three exemplary embodiments of receiving nodes shown in the environment of a communications network accordance with the inventive principles described herein.

FIG. 3 shows a variety of implementations for enabling a power consuming component. Receiving nodes I, II, and III represent exemplary embodiments of such implementations, and are described below in detail. Generally, each of the nodes I, II, III includes at least one processor 18, 28, 38, connected to at least one SERDES 16, 26, 36, where a channel 10, 20, 30 is connected to the SERDES 16, 26, 36.

With reference to node I, the node is configured to enable a power consuming component that has a default disabled state. The component may include, but is not limited to, a SERDES 16 and/or processor 18 such as a central processing unit. In FIG. 3, the SERDES and processor are shown as separate components. It will be appreciated these components do not necessarily have to be distinct components, for example, many processors can have one or more SERDES within the processor structure. One of skill in the art further will appreciate that the specific power consuming components and their configurations as shown are not meant to be limiting, and can generally be any component or module that consumes power for the processing and/or transmission of data.

The channel 10 can receive data (see FIG. 4) from a data source or network N, and transmits the data received to at least one of the power consuming components (e.g. SERDES 16 and/or processor 18). For example, the network N can be an electrical or a fiber optic network, the configuration and design of which is known to one of ordinary skill in the art.

In FIG. 3, the channel 10 transmits data received from the network N to the SERDES 16. Generally, one of skill in the art would appreciate that the channel 10 would include suitable connections with the power consuming components and/or the resonator, such as electrical wiring or optical fibers to carry out receive and transmit functions to and from the channel 10. In one embodiment, the channel 10 of node I includes a photodiode 12 to receive and conduct/transmit data. As the channel 10 is disposed upstream of the resonator 14, the channel 10 can also receive an enabling data pattern (discussed in detail below with respect to FIG. 4) from the network N.

The resonator 14 controls whether the power consuming component, such as the SERDES 16 and/or processor 18, is either enabled to receive data transmitted from the network N, or in its default disabled state where the component is operating under reduced power. As shown in node I in FIG. 3, the resonator 14 is operatively connected to the channel 10 and is an electrical resonator. It will be appreciated the design and configuration of an electrical resonator suitable for implementing the inventive concepts of this disclosure would be well known to a person of ordinary skill in the art. For example, the resonator can employ resistor and capacitor components to produce a suitable RC circuit.

The resonator 14 receives data, including the enabling data pattern if present, from the data source N through the channel 10. That is, the resonator receives a copy of the signal that eventually reaches the SERDES, and the resonator is configured to respond or be triggered when a specific pattern (e.g. enabling data pattern) is present for a sufficient amount of time. The resonator 14 is connected to the SERDES and/or the processor 18 (see the dashed lines from the resonator 14 to the SERDES 16 and to the processor 18) to send an enable signal to enable the SERDES 16 and/or the processor 18 when the enabling data pattern is present. When enabled, the SERDES 16 looks for data transmitted by the data source via the channel 10. In the enabled state, the power consuming components such as the SERDES 16 and the processor 18 are sufficiently powered on to receive data transmitted through the channel 10.

When the enabling data pattern is not present, the resonator does not send the enable signal and the SERDES 16 and/or the processor 18 remain or return to the default disabled state. This return to the default disabled state may occur, for example, after a set time period, after a defined function has completed such as the processor completing some action, or when the resonator receives another enabling data pattern. Thus, the resonator controls the state of the SERDES 16 and/or the processor 18. Thus, the resonator 14 can be viewed as a toggle that swaps states. In the disabled state, the power consuming components are in a standby state or sufficiently powered down to where they do not receive data.

Turning to the enabling data pattern, FIG. 4 generally shows one embodiment of a data stream 50 that can be transmitted from the network N, and which is applicable to any of the receiving nodes I, II, III described herein. For ease of description, the data stream is discussed with respect to receiving node I. The data stream 50 includes data 52, which includes the network data that can be transmitted to the SERDES 16 and the processor 18 when they are enabled. The data stream 50 also includes an enabling data pattern 54 embedded in the data stream 50. A corresponding wave form 56 of the resonator's response to the data stream 50 is depicted below the stream 50. Generally, the data 52 and enabling data pattern 54 usually are present in one frequency band where the intent is to determine or designate the enabling data pattern 54 as a pattern within the one frequency band that can trigger the resonator 14.

Any type of enabling data pattern that can trigger the resonator can be employed. In one embodiment, the enabling data pattern 54 can be one or more K-patterns. K-patterns, also known as K-characters, are generally known as control characters employed in SERDES communication methods and are typically employed in link training testing instances to exercise a communications system. K-patterns are known binary digit data patterns (e.g. several "1" bits in a row and/or several "0" bits in a row). According to the inventive concepts of this disclosure, K-patterns are first determined and filtered through the resonator 14. When K-patterns are used, the K-patterns act or behave as sine waves which can trigger the resonator 14 at certain thresholds or frequencies, for example the number of K-pattern occurrences.

In other embodiments, the enabling data pattern 54 can be one or more bypass patterns. A bypass pattern can be a specifically designated data pattern that is recognized by the resonator 14 and triggers the resonator 14. Differently from K-patterns, bypass patterns can be designated without going to look up tables. Bypass patterns may be employed, for example, when a K-pattern(s) does not meet the necessary threshold to trigger the resonator 14. It will be appreciated that the enabling pattern 54 may include either or both of K-patterns and bypass patterns.

In the embodiment shown in FIG. 4, the enabling data pattern 54 represents four smaller data patterns that occur adjacent each other. Generally, using smaller data pattern occurring together can help reduce false instances, where power consuming components need to be enabled to receive data, and inadvertent triggering of the resonator. Depending on the sensitivity of the resonator, it will be appreciated that more or less than four smaller data patterns may be employed as the enabling data pattern 54. In some embodiments, more than one of the smaller data patterns is desired to provide some sensitivity in the enabling data pattern so that a certain threshold is reached and the resonator can be triggered. For example, two adjacently occurring smaller data patterns is more rare than one occurring small data pattern, and three adjacently occurring smaller data patterns is more rare than two adjacently occurring smaller data patterns, and so on. It will be appreciated that the smaller patterns may be the same as or different from each other. It further will be appreciated that the enabling data pattern 54 may be determined or designated as one continuous (e.g. longer) pattern of data suitable for triggering the resonator.

Other receiving node designs can be utilized in addition to or separately from receiving node I. Receiving node II in FIG. 3 includes a channel 20 connected to a resonator 24. The channel 20 includes a photodetector 22 that can be a dual photodiode. For example, the photodetector 22 can be configured with a dual photodiode that transmits the signal from the data source to the power consuming components (e.g. SERDES 26 toward processor 28), and that transmits some portion of the signal from the data source to the resonator 24. Once the enabling data pattern is received by the resonator 24, the resonator 24 is triggered to then enable the SERDES 26 and/or the processor 28. It will be appreciated that the resonator 24 operates similarly as the resonator 14 of receiving node I and can be configured as an electrical resonator.

Receiving node III is configured for an embodiment where fiber optical communications are employed. Receiving node III includes a resonator 34 that is an optical resonator. It will be appreciated that one of skill in the art can design an optical resonator as suitable for the inventive concepts of this disclosure. Such suitable optical resonators can include but are not limited to, for example a micro-ring or micro-disc resonator. As shown, the resonator 34 is connected to the network N upstream from the channel 30 and can include its own photodetector 31 for converting the optical enabling data pattern into an electrical signal, and for sending the enable signal to the power consuming components (e.g. SERDES 36 and/or processor 38).

The receiving nodes I, II, and III shown in FIG. 3 can represent separate embodiments where the respective resonator is dedicated to one channel for each receiver. It will be appreciated that any of the implementations shown can be multiplied into numerous channels to satisfy a desired communications network. For example, any of a plurality of resonators and channels dedicated to a plurality of power consuming components may be employed. Each channel can be connected to a distinct set of power consuming components (e.g. a plurality of SERDES), where a respective resonator can receive an enabling data pattern. When the enabling data pattern is received, the resonator enables the power consuming component(s) connected to the respective channel to permit receipt of data transmitted through the respective channel. In the absence of receiving the enabling data pattern, the resonator will not be triggered and the respective power consuming component(s) will remain or return to their disabled state. It will be appreciated that the enabling pattern for each resonator may be the same or different from the enabling pattern of another resonator.

In other embodiments, a single resonator can be employed for a plurality of channels, where each channel is dedicated to one or more power consuming components. In such a configuration, the single resonator would be disposed upstream from all the channels and power consuming components in the network, and can receive an enabling data pattern from the data source. When the enabling pattern is received by the single resonator, each power consuming component is enabled to receive data transmitted through the respective channel.

Thus, according to the inventive concepts described above, a method of enabling a power consuming component generally includes using a resonator to receive an enabling data pattern to enable the power consuming component. When the power consuming component is enabled, it is powered on to receive data from a data source. In the absence of the enabling data pattern, the power consuming component remains in or returns to a disabled state.

Among other benefits, the inventive concepts described herein can help avoid the need for significant resources (e.g. physical space, further processing, and bandwidth) to operate a communications network and can avoid a single point of failure, which can help avoid some of the risk of failure of an entire communications network. Adding a resonator to a receiving channel can avoid the need to add other complexities, such as a second modulation functionality on the transmission side of a communications network. Other benefits can also include that the enabling data pattern can be selected and embedded in an original data stream, which can simply pause a data stream without having to shut down the transmission side of a network and restarting, thereby avoiding interruption of other receiving channels from receiving data.

In one area of use, the devices and methods described herein can be employed in applications related to high speed data transmission networks for limiting power consumption to when data transmission is needed or desired. For example, the inventive concepts herein can be useful in the construction and design of photonic components for both electrical and fiber optical networks such as in WDM broadcasts and select communications architectures.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A power saving receiving node in a fiber optic network, comprising:
a channel having a channel input and a channel output, the channel input configured to connect to a data source to receive an optical data signal therefrom, the optical data signal including an enabling data pattern;
a power consuming component operatively connected to the channel output to receive data from the channel, the power consuming component having a default disabled state where it does not receive data from the channel; and
an optical resonator having a resonator input configured to operatively connect to the data source to receive the optical data signal including the enabling data pattern, and the optical resonator further includes a resonator output operatively connected to the power consuming component,
the channel output connected to the power consuming component is separate from the resonator output connected to the power consuming component,
the resonator input is separate from the channel input and the resonator input to receive the optical data signal from a location positioned upstream from the channel input so that the optical data signal introduced into the resonator input does not first enter the channel via the channel input,
the optical resonator includes a photodetector configured to convert the enabling data pattern into an electrical signal that is transmitted via the resonator output to the power consuming component to enable the power consuming component to receive data from the channel output.

2. The receiving node of claim 1, further comprising a plurality of additional optical resonators, each additional optical resonator is dedicated to a distinct channel and to at least one distinct power consuming component; each additional optical resonator being configured such that when it receives an enabling data pattern, the additional optical resonator generates an enable signal that enables the respective distinct power consuming component.

3. The receiving node of claim 2, wherein the enabling patterns for the optical resonators are the same.

4. The receiving node of claim 1, wherein the optical resonator is connected to a plurality of power consuming components each of which has a default disabled state.

5. The receiving node of claim 4, wherein the power consuming components comprise a serializer/deserializer and a processor.

6. The receiving node of claim 1, wherein the enabling data pattern comprises a plurality of adjacently occurring data patterns present in the optical data signal, where the data patterns are different from each other.

7. The receiving node of claim 1, wherein the channel output is connected to a serializer/deserializer, and the resonator output is connected to a serializer/deserializer.

8. A fiber optical communications network, comprising:
a data source configured to transmit an optical data signal that contains an enabling data pattern;
a receiving node connected to the data source to receive the optical data signal transmitted thereby, the receiving node including a channel having a channel input and a channel output, a power consuming component connected to the channel output to receive data from the channel, and an optical resonator
having a resonator input connected to the data source to receive the optical data signal including the enabling data pattern, and the optical resonator further includes a resonator output connected to the power consuming component,
the channel output connected to the power consuming component is separate from the resonator output connected to the power consuming component,
the resonator input is separate from the channel input and the resonator input to receive the optical data signal from a location positioned upstream from the channel input so that the optical data signal introduced into the resonator input does not first enter the channel via the channel input,
the optical resonator includes a photodetector configured to convert the enabling data pattern into an electrical signal that is transmitted via the resonator output to the power consuming component to enable the power consuming component,
wherein the power consuming component has a disabled state and an enabled state, and the power consuming component changes from the disabled state to the enabled state when the electrical signal is received from the resonator output.

9. The communications network of claim 8, wherein the power consuming component comprises a processor or a serializer/deserializer.

10. A method of enabling a power consuming component from a disabled state in a fiber optical communications network, comprising:
sending an optical data signal containing an enabling data pattern from a data source to an input of a channel having an output connected to the power consuming component to send data from the channel to the power consuming component;
separately sending the optical data signal containing the enabling data pattern to an input of an optical resonator that includes a photodetector, so that the optical data signal does not first enter into the input of the channel;
using the optical resonator to generate an electric enable signal upon receipt of the optical data signal by the optical resonator;
sending the electric enable signal from the optical resonator to the power consuming component to enable the power consuming component, and when enabled, the power consuming component receiving data from the channel.

* * * * *